United States Patent [19]

Hungerford

[11] 4,324,707

[45] Apr. 13, 1982

[54] FLOWABLE POLYACRYLONITRILE POWER TREATED WITH ESSENTIALLY PURE SOLVENT

[75] Inventor: Gordon P. Hungerford, Palmyra, N.Y.

[73] Assignee: Mobil Oil Corporation, New York, N.Y.

[21] Appl. No.: 136,192

[22] Filed: Apr. 1, 1980

[51] Int. Cl.³ .............................................. C08K 5/36
[52] U.S. Cl. ................................... 524/173; 525/487; 524/565
[58] Field of Search ................. 260/30.8 DS; 525/487

[56] References Cited

U.S. PATENT DOCUMENTS

| | | | |
|---|---|---|---|
| 2,307,371 | 8/1941 | Hileman | 136/124 |
| 2,897,171 | 7/1959 | Cseray et al. | 260/32.8 |
| 3,380,949 | 4/1968 | Isley | 260/30.4 |
| 3,560,425 | 2/1971 | Wolinski | 260/30.8 DS |
| 3,741,223 | 6/1973 | Kavera | 134/191 |
| 3,936,584 | 2/1976 | Patton | 428/458 |
| 4,028,302 | 6/1977 | Tynan | 260/30.8 DS |

FOREIGN PATENT DOCUMENTS 763334  2/1971  Belgium ........................... 525/487

*Primary Examiner*—William F. Hamrock
*Assistant Examiner*—Peter F. Kulkosky
*Attorney, Agent, or Firm*—C. A. Huggett; M. G. Gilman; J. P. O'Sullivan, Sr.

[57] ABSTRACT

A flowable polymeric extrusion powder consisting essentially of acrylonitrile polymer particles is provided at low temperature treated with a non-sticking amount of solvent. Sufficient solvent can be added to dissolve the polymer at elevated temperature, for instance, more than 120 parts by weight of dimethyl sulfoxide solvent can be added per hundred parts of dry polymer below ambient temperature.

9 Claims, No Drawings

FLOWABLE POLYACRYLONITRILE POWER TREATED WITH ESSENTIALLY PURE SOLVENT

BACKGROUND OF THE INVENTION

This invention relates to solvent-treated polymer powder. In particular it relates to novel polyacrylonitrile powders combined with solvent and to a method for preparing free flowing particles containing a large amount of solvent.

Homopolymers and interpolymers of acrylonitrile are useful in a variety of film and fiber applications. In many of these manufacturing processes, the polyacrylonitrile (PAN) resin is dissolved as a dry powder in a suitable solvent, such as dimethyl formamide (DMF) or dimethyl sulfoxide (DMSO), and cast or extruded into the desired shape at elevated temperature and pressure. Of particular interest in recent years are gas impermeable films made from clear solutions of PAN and DMSO, such as disclosed in U.S. Pat. No. 4,066,731. In such applications, homogeneous PAN solutions are necessary to obtaining good quality product. Undissolved solids or gases cause discontinuities which can affect appearance, film integrity and performance deficiencies.

When forming extruded or cast shapes continuously from PAN solutions, especially at moderate temperature and pressure, it is desirable to use a concentrated solution containing about 30 to 50 percent by weight of PAN. While such concentrations are attainable by prior methods of dissolution, excessively long solution times or very high temperatures are often required to obtain the necessary degree of homogeneity. Large amounts of solvent are required in order to obtain complete dissolution quickly. While the excess solvent may be removed by evaporation, this contributes to the higher cost of processing. Attempts to dissolve dry PAN powder with hot organic solvents at high concentrations by conventional methods have not been successful due to the tendency of the particles to adhere to one another and form a sticky mass of agglomerates. Partially solvated polymeric mixtures have a high viscosity and are difficult to dissolve because the fresh solvent cannot effectively penetrate the coalesced mass. In U.S. Pat. No. 4,028,302 a process is disclosed for making clear acrylonitrile polymer solutions from powder and high-boiling solvents, such as dimethyl formamide or dimethyl sulfoxide. The tendency of polymeric particles to form agglomerates during ordinary solution methods, coalescing into dough balls of partially solvated masses, is overcome by the use of a particular twin-screw machine. The process involves feeding polyacrylonitrile powder into a cool zone of the machine, and injecting organic solvent subsequently in the cool zone at a predetermined rate to form a relatively concentrated mixture in slurry, which is then heated while intermittently squeezing the slurry transversely to the screw axes. The clear, bubble-free solution is discharged at about 110°-150° C.

Prior attempts to dissolve acrylonitrile homopolymers and copolymers have generally required much larger amounts of organic solvent to be employed in the dissolution step than is required in extruding the product. For instance, a casting dope can be made by dissolving 18% PAN homopolymer in DMSO at 50° C. and evaporating to 30% PAN at about 75° C.

Prior attempts to prepare dry blends of PAN powders with various organic solvents have resulted in relatively small amounts of solvents being incorporated. For instance, in U.S. Pat. No. 3,380,949, PAN powder was dry blended with DMF, alone or as a cosolvent with ethylene carbonate or DMSO, by slow addition of the solvent at temperatures up to 300° F. However, large amounts of many solvents cannot be blended under such conditions according to prior techniques. DMF has been employed at concentrations up to 55 weight percent in certain circumstances. DMSO is especially difficult for dry blending with PAN because it has very high solvent power, even at ambient temperature. Attempts to prepare flowable PAN powders containing large amounts of dimethyl formamide by adding the DMF at low temperature have not been successful. It is an object of the present invention to prepare polyacrylonitrile powders in mixture with a suitable solvent for processing to form an extrusion mass of optimum concentration.

SUMMARY OF THE INVENTION

Flowable polymeric extrusion powders have been made which consist essentially of polyacrylonitrile particles of low-bulk density treated with a non-sticking amount of solvent, i.e., dimethyl sulfoxide. The DMSO is present in sufficient amount to dissolve the PAN polymer at elevated temperatures encountered in the typical hot extrusion process. These compositions are prepared as free-flowing particles by agitating a bed of finely-divided PAN particles in a dry contact zone at temperature below the melting point of the solvent (about 18° C. for DMSO), while injecting finely-dispersed solvent into the contact zone at an addition rate sufficiently low to prevent significant agglomeration of the PAN particles. The solvent is imbibed by the low-bulk density polymer particles by capillary action before it freezes to form easily-handled extrusion powders which remain non-sticking and flowable when retained in the slightly cooled state. By compressing and heating the solvent-treated PAN particles, while simultaneously allowing non-condensible gases to escape, a homogeneous extrusion mass can be produced which is essentially free of undissolved solids or gas.

DESCRIPTION OF PREFERRED EMBODIMENTS

In the following description of the invention and in the examples, metric units and parts by weight are used unless otherwise stated. In general, it is desired to obtain flowable powder product treated with at least 120 parts by weight of solvent per hundred parts of PAN resin (PHR); however, satisfactory and useful product can be made with as little as 80 PHR of DMSO. During handling of solvent-treated powders, the free-flowing character of DMSO-PAN compositions can be retained, even at relatively high solvent concentrations which would readily dissolve and fuse the resin at temperatures much above 18° C.

It is possible to make DMSO-treated polymer powders containing considerably more than 120 PHR of solvent that will remain free-flowing below the melting point of the solvent, which for pure dimethyl sulfoxide is 18.45° C. It is understood that even minor amounts of cosolvents or other solutes can change the melting point of the pure solvent markedly. While the one-component solvent is preferred for uniformity of product quality and ease of recovery, it is feasible to employ other compatible materials in the solvent phase. PAN is known to be soluble in tetramethylene sulfone, ethyl carbonate, dimethyl sulfone, dimethyl formamide, dimethyl acetamide, and other polar organic liquids or mixtures.

The present process may be applied in making dry PAN blends with various solvents. It is well known that polar organic compounds having one or more solvogenic groups such as N,N-substituted amides, sulfones, sulfoxides, sulfides, oxamides, oxazolidones, lactones, lactams, carbonates, amines and nitriles, can be solvents for polyacrylonitriles. A number of these solvents, such as N,N-diethyl formamide, have little solvent power at low temperature, but can be effective when heated. DMSO, however, dissolves PAN over a wide temperature range, unlike the dialkylamides. This renders the solvent-polymer blends sticky at ambient temperatures when present in large amounts. The invention is particularly useful for those organic compounds and mixtures which have a melting point below 20° C., but which have relatively high solvent activity in the liquid state at ambient temperature. Although PAN solvents have been determinely empirically, such properties as cohesive energy density have been recognized as being important in determining solubility. (see Macromolecular Reviews, Interscience Publ., 1968, and Textile Res. J., Nov. 1950, pp. 786–93).

It is advantageous to use essentially pure DMSO because its melting point is only slightly below normal ambient temperature (20° to 25° C.) and heat transfer costs are minimized thereby.

The preferred solvent for use herein consists essentially of dimethyl sulfoxide (DMSO); however, other non-deleterious materials may assist in the treatment. While clear white extrusion masses are generally desired, it may be advantageous to introduce dyes, u-v absorbers or other additives with the treating liquid or subsequently.

The acrylonitrile polymers used to make the solutions produced by the process of this invention include long-chained synthetic polymers having acrylonitrile units in the polymer chain. The term includes homopolymer of acrylonitrile and copolymers of at least 60% by weight of acrylonitrile and one or more suitably monoethylenically unsaturated monomers copolymerizable with acrylonitrile. Typical addition monomers which are copolymerizable with polyacrylonitrile include lower alkyl esters of $\alpha,\beta$-unsaturated carboxylic acids, such as methyl acrylate, butylacrylate, methyl methacrylate, other comonomers may include vinyl acetate, styrene, methacrylamide, methacrylonitrile, vinyl chloride, vinyl bromide, vinylidene chloride, methyl vinyl ketone and the like as well as any of the available vinyl pyridines.

The polyacrylonitrile starting material used herein is essentially dry and in a finely-divided state. Although such materials may be shipped in a form containing relatively large granules or noodles, these tend to be loosely bound agglomerates of very small particles. The particle size is typically in the range from submicron to a millimeter, with the average particle size being about 1 to 100 microns. Good results are obtained with those polymers having a mean size of about 10 microns to 100 microns. Uniformly-treated particles are easier to obtain with starting materials having close particle size distribution to assure adequate solvent penetration into the larger particles. This avoids undissolved solids when the treated material is heated to dissolution temperature in subsequent operations.

During the treatment steps the contact zone, in which polymer powder is brought into intimate contact with finely-dispersed liquid, is maintained at a temperature below that of the liquid melting point. In the zone there are several phases, including the gaseous phase in which the powder is suspended during the treatment step. Zone cooling may be achieved by externally jacketing the contact equipment or by other expedients. For instance, relatively large and easily separated balls of inert heat exchange material, such as ceramics, may be tumbled in the zone. The amount of cooling should be sufficient to assure adequate removal of any excess exothermal interface energy released by the interaction of the powder and treating liquid. In addition, the use of relatively high-shear mixing equipment can generate excess heat which requires removal.

The operating pressure and temperature ranges for the contact treatment step may be varied considerably within the inventive concept. For instance, vacuum or even high pressures are possible, depending upon the type of equipment available. Typically, the system is maintained at or near ambient atmospheric pressure, usually about 0.1 to 10 atmo. The preferred temperature for treating polyacrylonitrile particles with DMSO is about $-20°$ C. to $+18°$ C., with optimum utilization being achieved at about 1° to 4° C., sufficiently cold to prevent formation of sticking particles, but warm enough to permit fast migration of an effective amount of DMSO into the particles. Very low temperature in the contact temperature zone may cause premature solidification of the liquid and retard migration of the solvent into the core of the polymeric particle.

The liquid solvent is easily introduced to the moving powder contact zone during treatment by atomizing means. Various pressure head type air-less spray devices are available for dispersing the liquid solvent as a fine spray or the like. By employing a solvent which is liquid at room temperature, but solidifies slightly below ambient, ordinary atomizer equipment can be adapted to the process equipment without cooling the solvent feedstream.

The solvent enters the treatment zone and is deposited upon the powder particles, forming a coating thereon from which solvent can migrate into the polymeric particle, being imbibed into the interstices of the polymer. By introducing the solvent at a controlled rate, the concentration gradient of solvent throughout the particle is adjusted to the desired rate to avoid forming a sticky mass. The solvent can be added intermittently or continuously, depending upon the rate of addition. For instance, with DMSO a rate of more than 10 PHR per min., based on dry resin, can be achieved. Periodic interruptions in the solvent addition permits even distribution of the added liquid in the particle bed. As the particle becomes laden with solvent, typically beyond about 120 PHR of DMSO, the rate of imbibition may decline, causing the particle to retain a wet surface for a longer time. In the final period of addition the particle may reach equilibrium with DMSO, at which point further absorption stops. The amount of DMSO is effective for completely dissolving the solids at elevated temperature, say 50° to 175° C. It appears that further addition merely builds the DMSO coating without substantial migration inwardly, but if temperature is kept low this coating is frozen and solid. Such mixtures can have solvent ratios in excess of 140 PHR to produce powders which can be heated to form homogeneous solutions of 40% or less PAN by weight.

The polymer powder may be treated in various types of equipment, including rotary driven tumblers, agitated vessels and particle-fluidizing contractors, suitably adapted for introducing liquid to the powder contact zone in droplet form. In order to assure even distribution of the solvent throughout the bed of particles, the equipment should be provided with means for maintaining the bed of particles in motion during addition of the solvent. Most tumblers, fluidizers, etc., provide a random mixing action, which helps to distribute the solvent component uniformly throughout the bed. Batch mixing operations may be carried out in a closed mixer, such as a Henschel rotary mixer. For large scale continuous operations, a powder treatment unit, such as described in U.S. Pat. No. 3,741,223, suitably modified for excluding moisture, may be employed for applying the solvent to the polymeric powders. The powder can be pre-cooled well below 18° C. prior to its introduction to the treating zone and thereafter cooled between a plurality of treating zones to maintain the desired temperature. Likewise, cooling means may be provided for the materials while contained in the treating zone.

Since DMSO-treated polyacrylonitrile particles are very hygroscopic care should be taken to avoid moisture in the equipment and processing streams when treated powders containing a major amount of DMSO are desired. Air may be dried by passing it through a bed of desiccant to provide essentially moisture-free inert gas, or dry nitrogen may be employed in the process.

In feeding the free-flowing powder from the treatment zone to the compressing means, care should be taken to retain the flowable character of the material. Handling or conveying equipment may require refrigeration to prevent coalescing the particles. For instance, in U.S. Pat. No. 2,307,371, a chilled hopper is used to prevent liquefaction of a molding composition by passing coolant through a conical jacket surrounding a feed hopper mounted above a forming press. Suitable modification of existing equipment to exclude moisture and provide cooling means can be accomplished by common expedients.

The solvent-treated polymer powder may be employed as a plastic molding composition for a variety of products, including films or foils, fibers, extrusions, castings, etc. For casting continuous film or the like, it is desirable to obtain a homogeneous mass of polymer-solvent mixture. A single phase dimethyl sulfoxide solution of polyacrylonitrile essentially free of undissolved particles of solid or gas may be prepared by several techniques. Existing equipment, such as a twin-screw extruder, can provide an extrusion mass of acceptable quality and means for feeding, compressing, plasticizing, degassing and homogenizing resin powder. Suitable means for blanketing DMSO-treated acrylonitrile polymers with dry, inert gas, such as nitrogen, may be required for certain operations to assure product quality. Means for maintaining an inert gas atmosphere throughout the mixing, feeding and compressing stages may be provided to prevent caking of the powder by moisture absorbed from ordinary wet ambient air.

EXAMPLE 1

A rotary mixer (Henschel 2JSS) is cooled to about −8° C. by circulating refrigerated glycol solution in a jacket around the contact zone and charged with about 580 grams of duPont Type A polyacrylonitrile homopolymer noodles having a surface area of 52 m$^2$/grams. After permitting the contents to cool by contact with the walls, during which time the noodles are comminuted to a fine powder, about 66 g/min. of DMSO is atomized into the contact zone while driving the mixer at 1800 rpm. The solvent is introduced through a small orifice in the top of the mixer at ambient temperature, using an airless spray gun. The solvent is sprayed in one minute bursts with intervals of no feed for another minute between additions. The powder stays in the 1°–4° C. range during treatment. Upon reaching a solvent ratio of 85 parts per hundred of resin, the product is inspected and found to be dry to the touch, non-caking and flowable. At room temperature the same powder does not cake, even when squeezed manually.

Further addition of DMSO to obtain greater solvent content provides a product which is flowable below 18°, but fuses at room temperature, at about 120 to 140 PHR. These powders can be heated to dissolve the polymeric component and additional solvent or dilute DMSO-PAN solution can be added to obtain the desired concentration for a casting dope, extrusion mass or the like. At addition amounts greater than about 120 PHR, the polymer can be dissolved at elevated temperature without additional liquid. The lower addition products containing 80 to 120 PHR, for instance, provide a plasticized resin which is receptive to rapid dissolution in more hot solvent.

EXAMPLE 2

The procedure of Example 1 is followed except that the mixer jacket is cooled with −20° C. coolant and the DMSO is added at 80 cc/min. in 15-second bursts, followed by equal intervals without solvent addition. The addition is continued until 138 PHR is reached, at which point dry, free-flowing powder is recovered. When heated to room temperature, the powder becomes sticky.

The powder is processed into an extrusion mass by introducing it into a screw-type unit having means for compressing and transporting the material as it is heated through the ambient temperature range by external or internal heater means. As the powder is processed, gas may be withdrawn to prevent bubble formation in the product. Suitable vacuum gas withdrawal means can be operatively connected to the screw processor at the cool entrance zone or the hot downstream zone in a known manner. Typically, the powder passes continuously through a first zone maintained from ambient temperature or cooler up to 100° C. and a second zone at higher temperature, i.e., 150° to 175° C., while maintaining adequate pressure.

The preferred equipment includes a twin-screw Werner-Pfleiderer processor. As disclosed in U.S. Pat. No. 4,028,302, incorporated herein by reference, additional hot solvent or other liquid additives can be injected into the coalesced powder during processing. For instance, powder containing only 120 PHR of DMSO could be coalesced and added to more dilute PAN solution in DMSO or pure solvent to obtain the final solution of lower concentrations, if desired.

While the invention has been described by particular examples, there is no intent to limit the inventive concept except as set forth in the following claims.

I claim:

1. A method for preparing free flowing particles consisting essentially of polyacrylonitrile polymer and essentially pure dimethyl sulfoxide which comprises:

(a) maintaining an agitated bed of finely-divided polyacrylonitrile particles in a dry essentially moisture free contact zone at temperature from about 1° C. to 18° C.;
(b) injecting finely-dispersed dimethyl sulfoxide into said contact zone at an addition rate sufficiently low to prevent significant agglomeration of the polyacrylonitrile particles, wherein about 80 to 140 parts by weight of dimethyl sulfoxide are added per 100 parts by weight of polyacrylonitrile; and
(c) permitting migration of an effective amount of dimethyl sulfoxide into said particles while maintaining the contact zone below 18° C.

2. The method of claim 1 wherein at least 120 parts of dimethyl sulfoxide are added and wherein said polyacrylonitrile polymer has a specific surface area of 5 to 60 m²/gram.

3. The method of claim 1 wherein said addition rate does not exceed an average rate of about 12 parts of dimethyl sulfoxide per 100 parts of polyacrylonitrile per minute.

4. The method of claim 1 wherein said contact zone is maintained at about 1°-4° C. with an inert, moisture-free atmosphere.

5. The method of claim 1 including the additional steps of compressing and heating the sulfoxide-treated particles to produce an extrusion mass comprising a dimethyl sulfoxide solution of polyacrylonitrile.

6. The method of claim 5 wherein said extrusion mass is a homogeneous phase, essentially free of undissolved particles of solid or gas.

7. A flowable polymeric extrusion powder consisting essentially of polyacrylonitrile polymer particles treated with a non-sticking amount of essentially pure dimethyl sulfoxide solvent imbibed in said particles said dimethyl sulfoxide being at a temperature below its melting point and being present in sufficient amount to dissolve said polymer at elevated temperature, said powder comprising at least 120 parts by weight of solvent per hundred parts of dry powder.

8. The powder of claim 7 wherein said solvent is essentially pure dimethyl sulfoxide in a ratio of about 120 to 140 parts per hundred by weight.

9. A method for preparing free flowing particles consisting essentially of an acrylonitrile homopolymer and a polar organic solvent consisting essentially of dimethyl sulfoxide having a melting point below 20° C. and relatively high solvent activity at ambient temperature, which comprises agitating acrylonitrile polymer particles in a dry contact zone at temperature below the solvent melting point;
(a) injecting finely-dispersed solvent into said contact zone while maintaining said contact zone below said melting point; and
(b) recovering solvent-treated polymer particles from said contact zone.

* * * * *